US012654767B2

(12) United States Patent
Rengarajan et al.

(10) Patent No.: US 12,654,767 B2
(45) Date of Patent: Jun. 16, 2026

(54) SYSTEMS AND METHODS FOR BRAKE PULL AND/OR TORQUE STEER DRIVER FEEL MITIGATION

(71) Applicant: STEERING SOLUTIONS IP HOLDING CORPORATION, Saginaw, MI (US)

(72) Inventors: Karthik Rengarajan, Auburn Hills, MI (US); Scott T. Sanford, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 58 days.

(21) Appl. No.: 18/633,971

(22) Filed: Apr. 12, 2024

(65) Prior Publication Data

US 2025/0136174 A1    May 1, 2025

Related U.S. Application Data

(60) Provisional application No. 63/594,727, filed on Oct. 31, 2023.

(51) Int. Cl.
B62D 6/00 (2006.01)
(52) U.S. Cl.
CPC .................................. B62D 6/001 (2013.01)
(58) Field of Classification Search
CPC ....... B62D 6/001; B62D 6/008; B62D 5/0472
See application file for complete search history.

(56) References Cited

U.S. PATENT DOCUMENTS

| | | | | |
|---|---|---|---|---|
| 10,407,091 B2 * | 9/2019 | Minamiguchi | ...... | B62D 5/0463 |
| 2005/0209752 A1 * | 9/2005 | Ono | ........................ | B62D 5/008 701/41 |
| 2006/0086560 A1 * | 4/2006 | Furusho | ............... | B62D 5/0463 180/446 |
| 2008/0208412 A1 * | 8/2008 | Shinmura | .............. | B62D 9/002 701/42 |
| 2014/0229065 A1 * | 8/2014 | Dornhege | ............ | B62D 15/025 701/41 |
| 2016/0236708 A1 * | 8/2016 | Lefler | .................. | B62D 5/0472 |
| 2020/0401891 A1 * | 12/2020 | Xu | ............................ | G06N 3/08 |
| 2022/0108207 A1 * | 4/2022 | Graf | ........................ | G06N 20/00 |

* cited by examiner

*Primary Examiner* — Kurt Philip Liethen
(74) *Attorney, Agent, or Firm* — Dickinson Wright PLLC

(57) ABSTRACT

A method for mitigating undesirable steering torque includes: in response to a determination that a vehicle is braking, determining whether the vehicle is experiencing brake pull: in response to a determination that the vehicle is experiencing brake pull, determining whether the vehicle is moving in according to a driver intention; in response to a determination that the vehicle is moving according to the driver intention, learning function coefficients for a rack-force impact due to the brake pull; in response to a determination that a learning is matured, predicting a rack load effect due to the brake pull; and generating a handwheel actuator command, the handwheel actuator command being configured to, when applied to the handwheel actuator, cause the handwheel actuator to oppose the rack load effect.

20 Claims, 8 Drawing Sheets

400

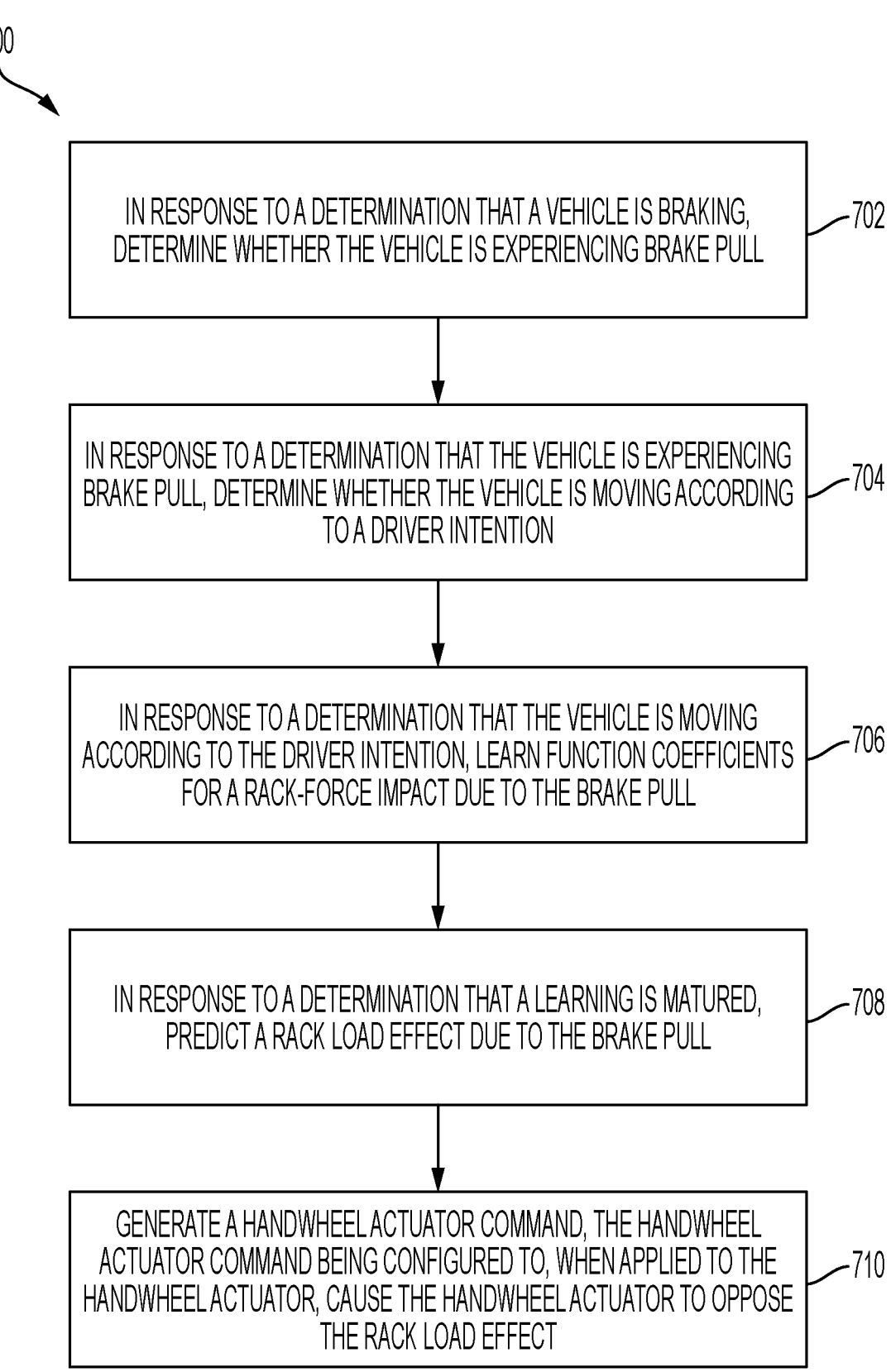

700

IN RESPONSE TO A DETERMINATION THAT A VEHICLE IS BRAKING, DETERMINE WHETHER THE VEHICLE IS EXPERIENCING BRAKE PULL — 702

IN RESPONSE TO A DETERMINATION THAT THE VEHICLE IS EXPERIENCING BRAKE PULL, DETERMINE WHETHER THE VEHICLE IS MOVING ACCORDING TO A DRIVER INTENTION — 704

IN RESPONSE TO A DETERMINATION THAT THE VEHICLE IS MOVING ACCORDING TO THE DRIVER INTENTION, LEARN FUNCTION COEFFICIENTS FOR A RACK-FORCE IMPACT DUE TO THE BRAKE PULL — 706

IN RESPONSE TO A DETERMINATION THAT A LEARNING IS MATURED, PREDICT A RACK LOAD EFFECT DUE TO THE BRAKE PULL — 708

GENERATE A HANDWHEEL ACTUATOR COMMAND, THE HANDWHEEL ACTUATOR COMMAND BEING CONFIGURED TO, WHEN APPLIED TO THE HANDWHEEL ACTUATOR, CAUSE THE HANDWHEEL ACTUATOR TO OPPOSE THE RACK LOAD EFFECT — 710

FIG. 7

SYSTEMS AND METHODS FOR BRAKE PULL AND/OR TORQUE STEER DRIVER FEEL MITIGATION

CROSS-REFERENCES TO RELATED APPLICATIONS

This patent application claims priority to U.S. Provisional Patent Application Ser. No. 63/594,727, filed Oct. 31, 2023 which is incorporated herein by reference in its entirety.

TECHNICAL FIELD

This disclosure relates to steering systems and in particular to systems and methods for mitigating undesirable driver feel due to brake pull and/or torque steering.

BACKGROUND OF THE DISCLOSURE

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE DISCLOSURE

This disclosure relates generally to vehicle steering systems.

An aspect of the disclosed embodiments includes a system for mitigating undesirable steering torque. The system includes a processor, and a memory. The memory includes instructions that, when executed by the processor, cause the processor to: in response to a determination that a vehicle is braking, determine whether the vehicle is experiencing brake pull; in response to a determination that the vehicle is experiencing brake pull, determine whether the vehicle is moving in according to a driver intention; in response to a determination that the vehicle is moving according to the driver intention, learn function coefficients for a rack-force impact due to the brake pull; in response to a determination that a learning is matured, predict a rack load effect due to the brake pull; and generate a handwheel actuator command, the handwheel actuator command being configured to, when applied to the handwheel actuator, cause the handwheel actuator to oppose the rack load effect.

Another aspect of the disclosed embodiments includes a method for mitigating undesirable steering torque. The method includes: in response to a determination that a vehicle is braking, determining whether the vehicle is experiencing brake pull: in response to a determination that the vehicle is experiencing brake pull, determining whether the vehicle is moving in according to a driver intention; in response to a determination that the vehicle is moving according to the driver intention, learning function coefficients for a rack-force impact due to the brake pull; in response to a determination that a learning is matured, predicting a rack load effect due to the brake pull; and generating a handwheel actuator command, the handwheel actuator command being configured to, when applied to the handwheel actuator, cause the handwheel actuator to oppose the rack load effect.

Another aspect of the disclosed embodiments includes an apparatus for mitigating undesirable steering torque. The apparatus includes a controller configured to: in response to a determination that a vehicle is experiencing brake pull, determine whether the vehicle is moving according to a driver intention; in response to a determination that the vehicle is moving according to the driver intention, learn function coefficients for a rack-force impact due to the brake pull; predict a rack load effect due to the brake pull; and generate a handwheel actuator command based on the predicted rack load effect.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flow diagram generally illustrating a method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

In such steering systems, brake pull and/or torque steer events may result in undesirable steering feel (e.g., from the perspective of the driver of the vehicle). Increasingly, efforts have been made to mitigate brake pull events by manipulating the brake torque in a connected steering system. Additionally, efforts have been made to mitigate torque steer events, including approaches involving suspension geometry or vehicle configuration.

Figure 3A:
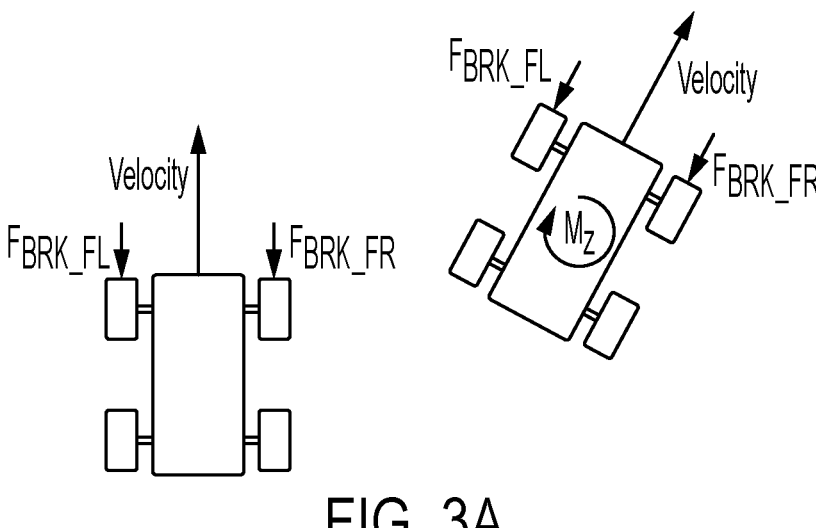
FIG. 3A generally illustrates a brake pull event according to the principles of the present disclosure.
Figure 3B:
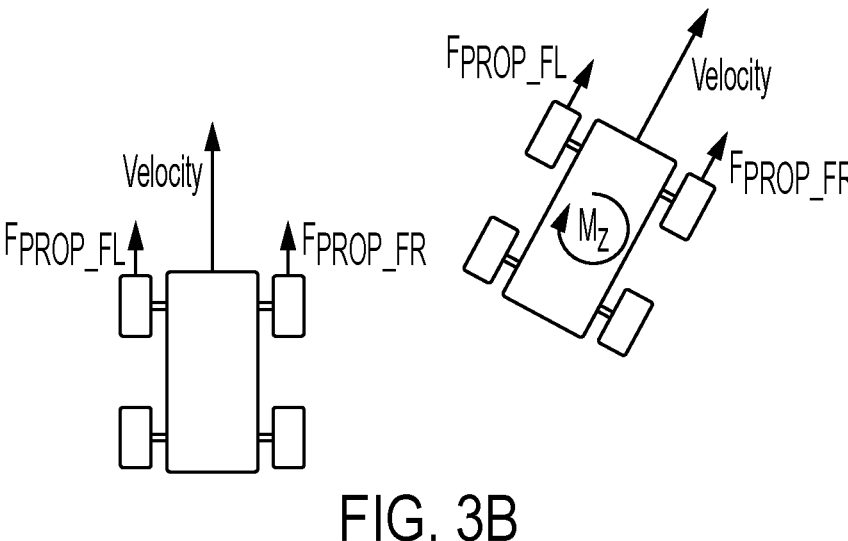
FIG. 3B generally illustrates a torque steer event according to the principles of the present disclosure.
Figure 3C:
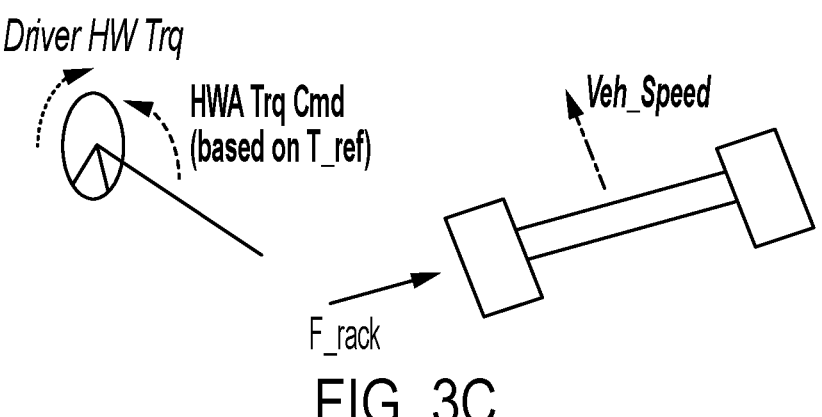
FIG. 3C generally illustrates induced torque steer according to the principles of the present disclosure.

Referring to FIGS. 3A-3C, such brake pull events and torque steer events are generally illustrated. Asymmetric brake/propulsion torque application between the left and right side on a vehicle can induce undesirable moment and correspondingly induces yaw rate to the vehicle which is known as brake pull/torque steer. Brake pull (e.g., FIG. 3A) can be caused by various faults in the brake system, whereas a torque steer (e.g., FIG. 3B) event can be due to the inherent vehicle construction and suspension geometry of the vehicle. This moment results in unwanted rack force, which finally affects the steering wheel torque feedback to the driver.

FIG. 3C illustrates uneven torque distribution on the axle between left and right wheels. This can potentially cause difference in wheel speeds across the wheels and thus can induce an unintended turn on the vehicle. This affects the steering wheel torque feedback felt by the driver.

Accordingly, systems and methods, such as those described herein, configured to mitigate the effects events (e.g., which may include brake pull events and/or torque steer events), may be desirable. In some embodiments, the systems and methods described herein may be configured to mitigate the undesirable steering wheel torque due to brake pull or torque steer on a SbW steering system (e.g., or any other suitable steering system including, but not limited to, rear steering systems). Additionally, or alternatively, the systems and methods described herein may be configured to mitigate undesirable steering torque associated with crowned roads, banked turns, and/or the like.

In some embodiments, the systems and methods described herein may be configured to not prevent the occurrence of brake pull or torque steer events. The systems and methods described herein may be configured to mitigate the unwanted steering wheel torque feedback to the driver.

The systems and methods described herein may be configured to overcome the undesirable handwheel torque by learning the rack load effect due to brake pull or torque steer. For example, for brake pull, the systems and methods described herein may be configured to learn the rack load pattern while the vehicle is driving on a straight line and the driver is intending to drive straight and braking. A mathematical model for brake pull effect on rack load may be defined according to:

$$F_{rack(BP\ Component)} =$$
$$a_0 + (a_1 * v_x) + \left(a_2 * \left(v_X^2\right)\right) + (a_3 * a_x) + \left(a_4 * a_x^2\right) + (a_5 * Bp)$$

4

-continued $$F_{rack(BP\ Component)-Pred} =$$
$$a_0' + (a_1' * v_x) + \left(a_2' * \left(v_X^2\right)\right) + (a_3' * a_x) + \left(a_4' * a_x^2\right) + (a_5' * Bp)$$

$v_x$—Longitudinal Vehicle Speed
$a_x$—Longitudinal Vehicle Acceleration
Bp—Master Cylinder Pressure OR Total Brake Torque Applied
$a_0, a_1, a_2, a_3, a_4, a_5$—True Scalar coefficients∈R
$a'_0, a'_1, 'a_2, a'_3, a'_4, a'_5$—Current Learned Scalar coefficients based on the available data∈R For torque steer, the systems and methods described herein may be configured to learn the rack load pattern while the vehicle is driving on a straight line and the driver is intending to drive straight and accelerating.

A mathematical model for torque steer effect on rack load may be defined according to, where AxleTrq corresponds to the propulsion torque at the axle:

$$F_{rack(TS\ Component)} =$$
$$a_0 + (a_1 * v_x) + \left(a_2 * \left(v_X^2\right)\right) + (a_3 * a_x) + \left(a_4 * a_x^2\right) + a_5(AxleTrq)$$
$$F_{rack(TS\ Component)-Pred} =$$
$$a_0' + (a_1' * v_x) + \left(a_2'' * \left(v_X^2\right)\right) + (a_3' * a_x) + \left(a_4' * a_x^2\right) + a_5(AxleTrq)$$

$fn(Force, v_x)$—Function that maps the rack force to generate effort component of a handwheel reference torque $$T_{ref_{TS}} = fn(K * F_{rack(TS\ Component)-Pred}, v_x)$$
$$T_{ref_{TS}} = fn(K * F_{rack(BP\ Component)-Pred}, v_x)$$
$$T_{(effort)_{net}} = fn(\text{Rack Force}, v_x) - T_{ref_{BP}} - T_{ref_{TS}}$$

The coefficients are actively learned using stochastic linear regression. The conditions to enable learning are as follows: Rack Acceleration magnitude less than a threshold; Rack Velocity magnitude less than a threshold; Column Velocity magnitude less than a threshold; Column Acceleration magnitude less than a threshold; Column Position magnitude less than a threshold: Longitudinal Velocity greater than a threshold; Driver Accelerator Pedal Pressed; Driver Brake NOT Pressed; and External Controller such as ABS, TSC, ESC Not Active.

The brake pull effect on rack force may be continuously predicted using the above model and the final rack force used as a reference to command the handwheel torque for the driver feedback may be compensated with the predicted brake pull component of rack force, according to:

$$F_{(Rack-HW-Effort)} = F_{Rack\_obs} - K * F_{rack(TS\ Component)-Pred}$$

The parameter K is a calibratable scalar gain, which is a function of vehicle speed, vehicle yaw rate, and lateral acceleration. In order to detect whether the vehicle is experiencing brake pull and/or torque steer, a yaw rate and lateral acceleration check during a driver intended straight line maneuver with braking or accelerating may be performed by the systems and methods described herein. In order to detect maturity in learning, the systems and methods described herein may be configured to compare the predicted vs actual during the learning phase and use a condition based on the threshold for difference between the predicted and actual rack force.

In some embodiments, the systems and methods described herein may be configured to use a mathematical model using rack force as a primary source of information to mitigate the disturbance. The systems and methods described herein may be configured to actively learn this function which gives more insight of what is actually happening in the system.

In some embodiments, the systems and methods described herein may be configured to, once the torque steer effect has been mitigated through the handwheel torque command, the handwheel can be maintained at a 0 degree position with reduced effort from the driver, which in turn drives the reference position for rack control which commands the road wheel actuator to maintain position control to move the vehicle in the intended direction.

Torque steer may be due to the difference in wheel speeds between the left and right wheel. Thus, it is proportional to the difference in speed between the wheels. The torque steer can also be dependent on the longitudinal vehicle speed and acceleration, and/or affected by the direction of the axle torque, which may be shown as:

$$F_{rack\,(TS\,Component)} = fn\,(v_x, a_x, \text{sign}(T_{axle}))$$

$$F_{rack\,(TS\,Component)} = a_2 * \left(v_x^2\right) + a_3 * v_x + a_4 * a_x + a_5 * a_x^2$$

$$K = fn\,(\text{Yaw rate}, ay) - \text{tunable}$$

$$T\_ref\_Final = T\_ref + K * F\_Rack\_TS$$

Two sets of the above expression may be used for 2 different directions in axle torque (e.g., positive and negative). Accordingly, 2 sets of coefficients may be learned. The coefficients may be actively learned using total least square fitting with more weight given to the latest set of data points. Initially, the system can be loaded with the coefficients learned through testing and as the vehicle runs, these estimates can be updated. The learning phase can be constrained when the driver is intending to go straight to avoid noise and other non-linearities in the system. Once the $F_{rack\,(TS\,Component)-Pred}$ and $F_{rack\,(BP\,Component)-Pred}$ is learned, the systems and methods described herein may be configured to mitigate by cancelling this term in the T_ref at all times to reduce the driver effort and to maintain the intended direction with reduced effort from driver.

In some embodiments, the systems and methods described herein may be configured to, in response to a determination that a vehicle is braking, determine whether the vehicle is experiencing brake pull. The systems and methods described herein may be configured to, in response to a determination that the vehicle is experiencing brake pull, determine whether the vehicle is moving in according to a driver intention.

The systems and methods described herein may be configured to, in response to a determination that the vehicle is moving according to the driver intention, learn function coefficients for a rack-force impact due to the brake pull. In some embodiments, the vehicle may be moving substantially straight and the driver intention indications an intention for the vehicle to move substantially straight.

The systems and methods described herein may be configured to, in response to a determination that a learning is matured, predict a rack load effect due to the brake pull. The systems and methods described herein may be configured to generate a handwheel actuator command, the handwheel actuator command being configured to, when applied to the handwheel actuator, cause the handwheel actuator to oppose the rack load effect.

Figure 1:
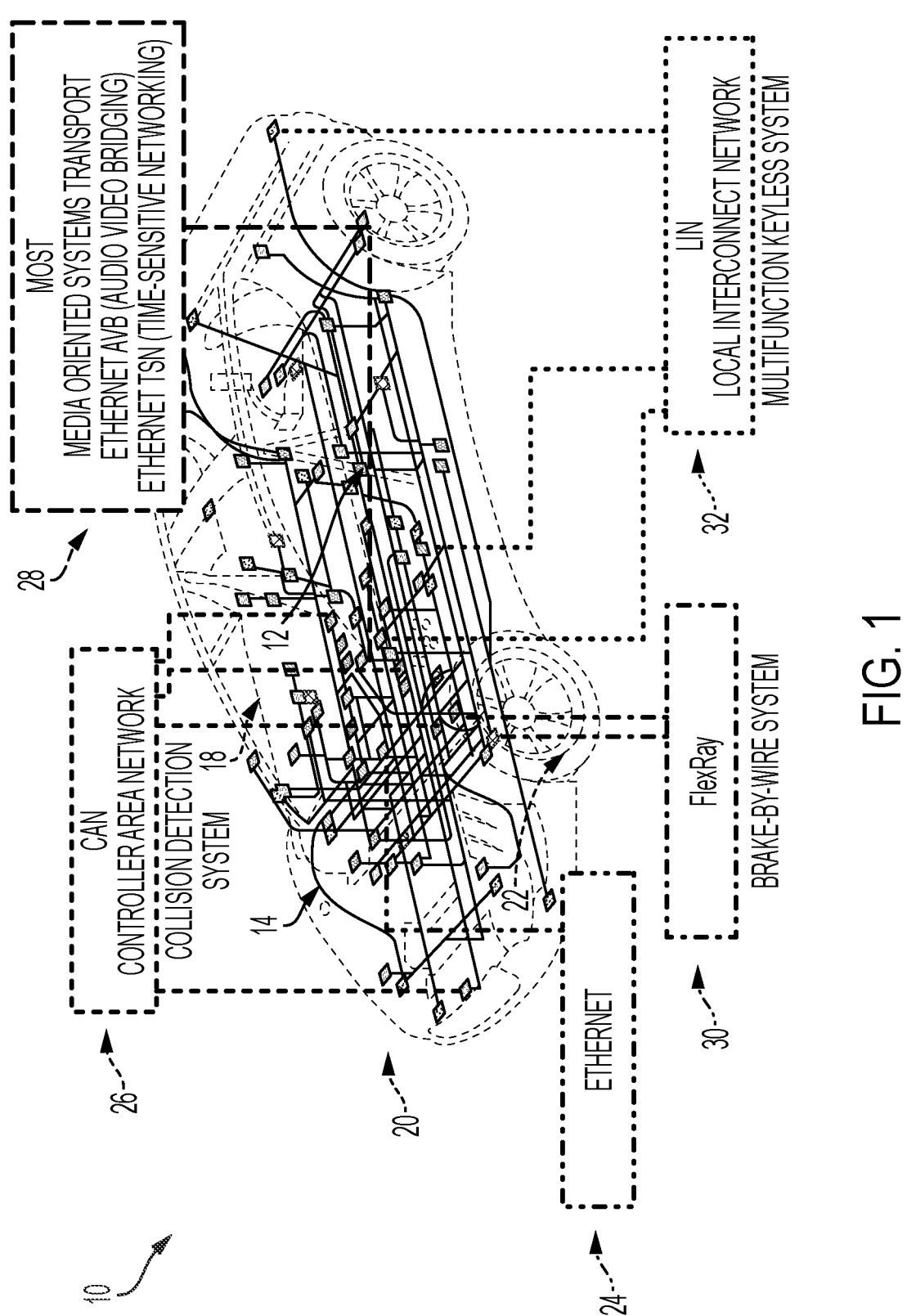
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2A:
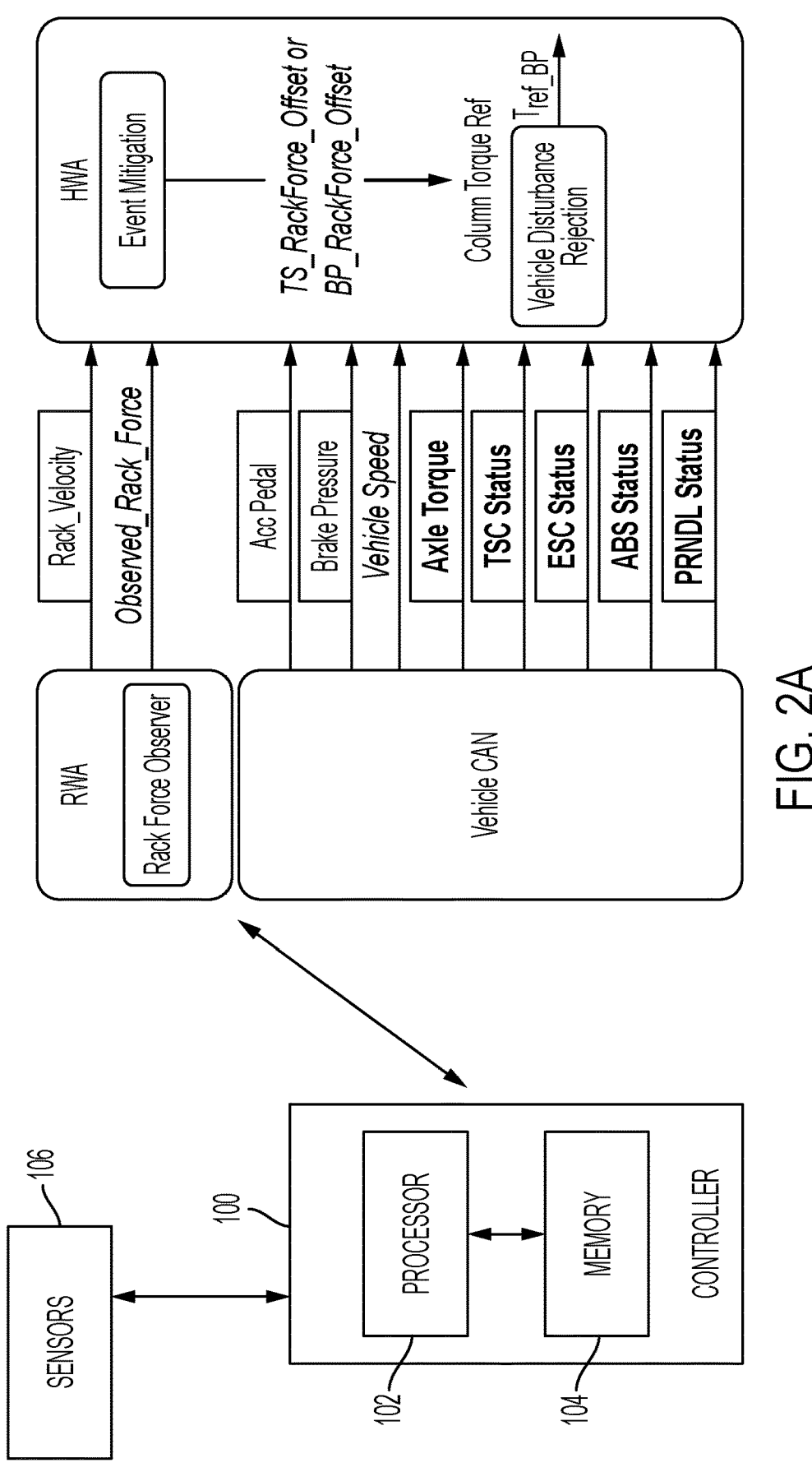
FIG. 2A generally illustrates a controller according to the principles of the present disclosure.

In some embodiments, the vehicle 10 may include a controller, such as controller 100, as is generally illustrated in FIG. 2A. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to, at least, control various functions of the steering system and/or perform any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to mitigate effects of events, which may include brake pull events and/or torque steer events. For example, the controller 100 may include and/or may communicate with a roadwheel actuator (RWA) and/or a handwheel actuator (HWA), is generally illustrated in FIG. 2A. The controller 100 may, relatively quickly and automatically learn and/or adapt to changes in vehicle dynamics within a predetermined (e.g. 10 or other suitable number) number of acceleration events (e.g. where Acceleration event=≥0.25 g longitudinal for >1 sec).

Once the learning cycles are complete (e.g., have matured), the controller 100 may limit peak steering wheel torque disturbance due to front axle propulsion torque changes (e.g., to increase or decrease) to <0.50 Nm during acceleration and/or deceleration events in the following conditions:

Acceleration up grade (nominal 7.2% grade)

Lateral accelerations+/−0.10 g

Any potential vehicle loading condition up to GVW rating

Any valid potential weight distribution (front/rear & left/right)

Axle torque induce rack load at calibrated limit (Tmax)

Figure 2B:
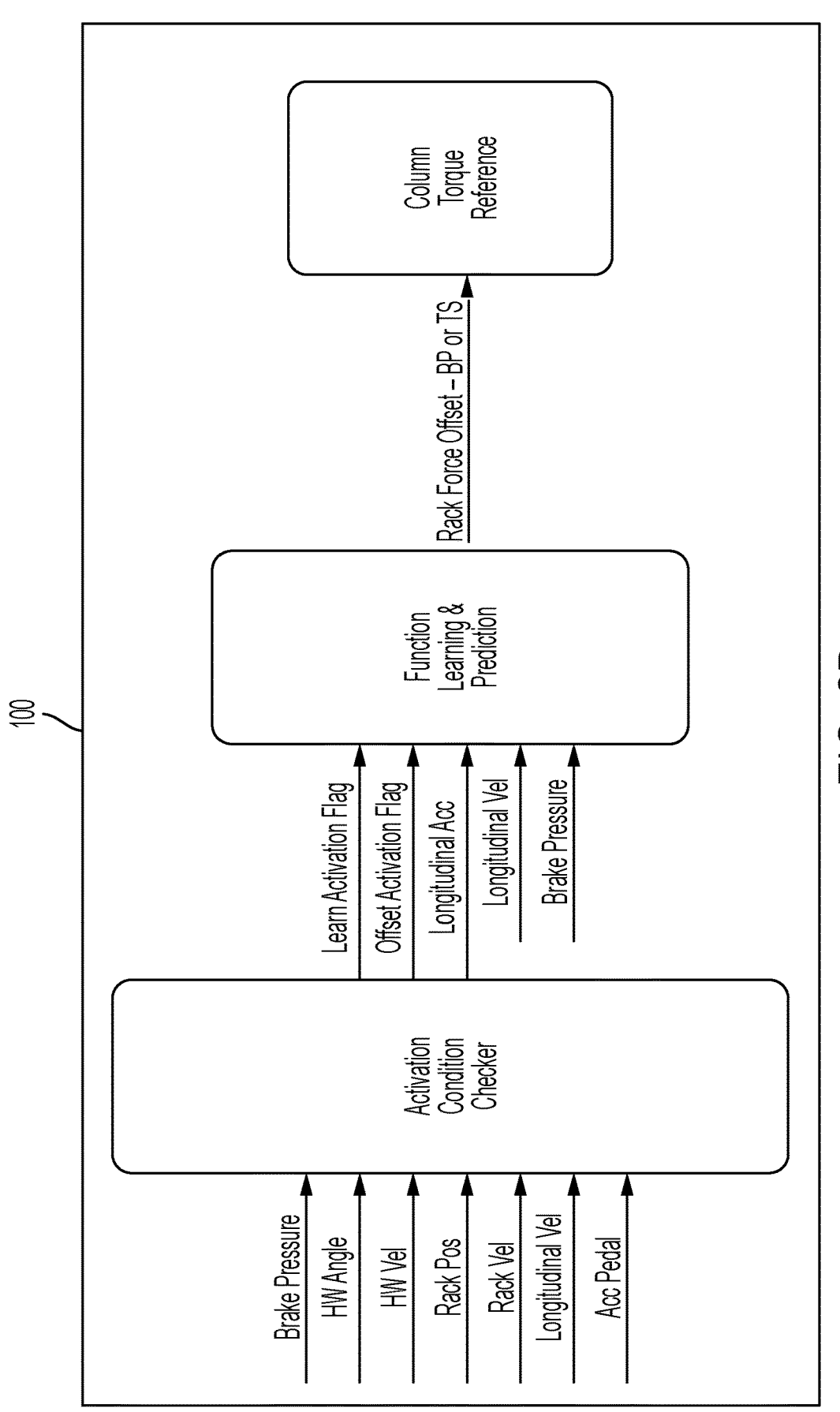
FIG. 2B generally illustrates a brake pull and/or torque steer mitigation functional block diagram according to the principles of the present disclosure.

As is generally illustrated in FIG. 2B. the controller 100 may receive various inputs (e.g., including, but not limited to, brake pressure, handwheel angle, handwheel velocity, rack position, rack velocity, longitudinal velocity, and acceleration pedal position or output) and provide activation and condition checking functionality. The activation condition checker functionality provides torque steer learning when the following conditions are met: the vehicle 10 is moving forward and straight, and the driver intent was to drive the vehicle straight or relatively straight; and the accelerator pedal is pressed (e.g., actuated) and the vehicle 10 is accelerating. The activation condition checker functionality activates the torque steer offset when the following conditions are met: the accelerator pedal is pressed; and the vehicle 10 is moving forward.

Additionally, or alternatively, the activation condition checker functionality provides brake pull learning when the following conditions are met: the vehicle 10 is moving forward and straight, and the driver intent was to drive the vehicle straight or relatively straight; and the brake pedal is pressed (e.g., actuated) and the vehicle 10 is decelerating. The activation condition checker functionality activates the brake pull offset when the following conditions are met: the brake pedal is pressed; and the vehicle 10 is moving forward.

The controller 100 set a learn activation flag, an offset activation flag, and provide function learning and prediction functionality. The function learning and prediction functionality: learns the torque steer effect on rack force through stochastic gradient descent; predicts the necessary rack force offset; and learns vehicle behavior and determines the limits for the offset.

The controller 100 may determine a rack force offset value and provide torque steering using the column torque reference. The column torque reference: converts the rack force offset to HW torque similar to the effort calculation; scales the calculated torque as a function of vehicle speed, and yaw rate; and applies the scaled torque as an offset to the total column torque reference.

In some embodiments, the controller 100 may, in response to a determination that the vehicle 10 is braking, determine whether the vehicle 10 is experiencing brake pull. The controller 100 may, in response to a determination that the vehicle 10 is experiencing brake pull, determine whether the vehicle 10 is moving in according to a driver intention.

The controller 100 may, in response to a determination that the vehicle 10 is moving according to the driver intention, learn function coefficients for a rack-force impact due to the brake pull. The vehicle 10 may be moving substantially straight and the driver intention indications an intention for the vehicle to move substantially straight.

The controller 100 may, in response to a determination that a learning is matured, predict a rack load effect due to the brake pull. The controller 100 may generate a handwheel actuator command. The handwheel actuator command may be configured to, when applied to the handwheel actuator, cause the handwheel actuator to oppose the rack load effect.

In some embodiments, the controller 100 may, in response to a determination that the vehicle 10 is experiencing brake pull, determine whether the vehicle is moving according to a driver intention. The controller 100 may, in response to a determination that the vehicle 10 is moving according to the driver intention, learn function coefficients for a rack-force impact due to the brake pull. The controller 100 may predict a rack load effect due to the brake pull. The controller 100 may generate a handwheel actuator command based on the predicted rack load effect; and In some embodiments, the controller 100 may, in response to a determination that the vehicle 10 is experiencing torque steer, determine whether the vehicle 10 is moving according to a driver intention. The controller 100 may, in response to a determination that the vehicle 10 is moving according to the driver intention, learn function coefficients for a rack-force impact due to the torque steer. The controller 100 may predict a rack load effect due to the torque steer. The controller 100 may generate a handwheel actuator command based on the predicted rack load effect.

In some embodiments, the controller 100 may perform the methods described herein. However, the methods described herein as performed by the controller 100 are not meant to be limiting, and any type of software executed on a controller or processor can perform the methods described herein without departing from the scope of this disclosure.

For example, a controller, such as a processor executing software within a computing device, can perform the methods described herein.

Figure 4:
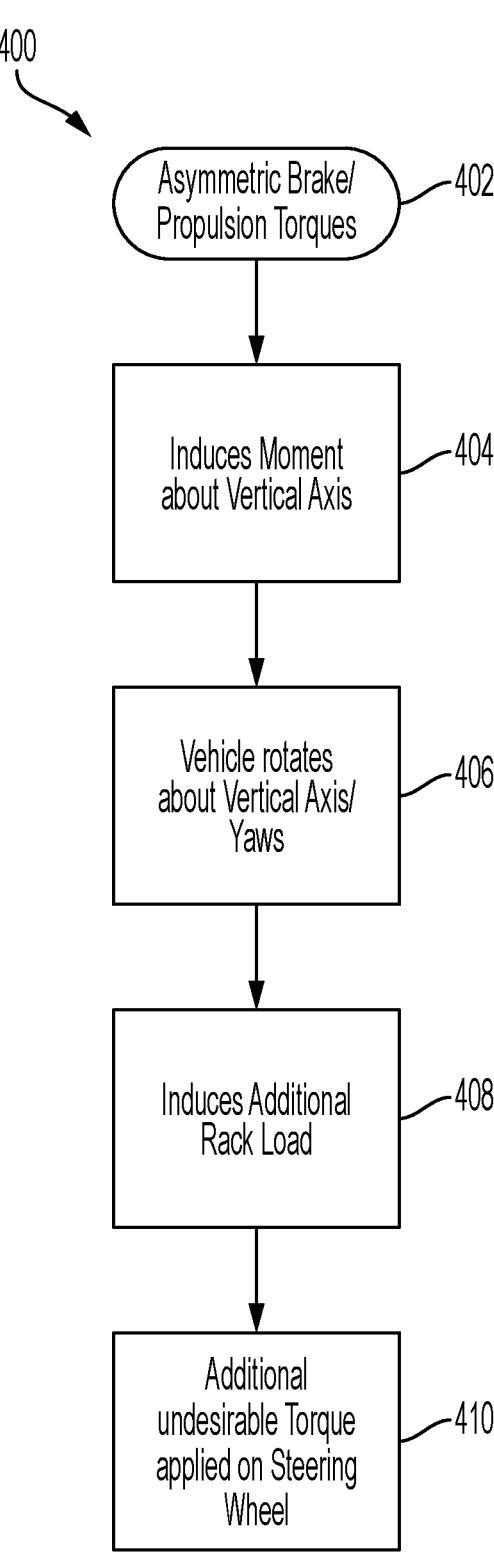
FIG. 4 is a flow diagram generally illustrating brake pull and/or torque steer event method according to the principles of the present disclosure.

FIG. 4 is a flow diagram generally illustrating a brake pull and/or torque steer event method 400, according to the principles of the present disclosure. At 402, the method 400 determines an asymmetric brake propulsion torque.

At 404, the method 400 induces a moment about a vertical axis.

At 406, the method 400 rotates the vehicle about the vertical axis/yaw.

At 408, the method 400 induces additional rack load.

At 410, the method 400 applies additional undesirable torque on the steering wheel (e.g., or handwheel).

Figure 5:
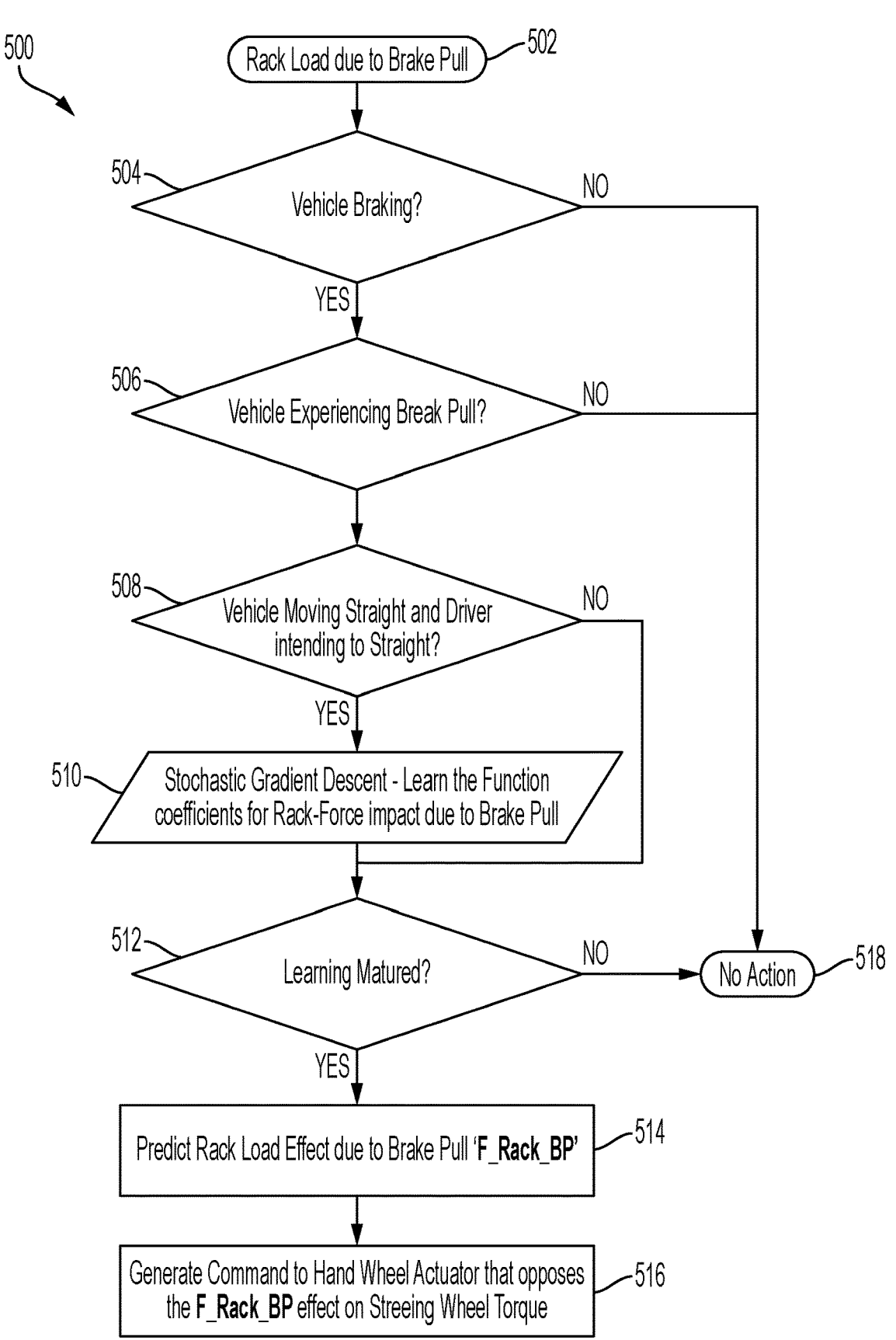
FIG. 5 is a flow diagram generally illustrating a brake pull mitigation method according to the principles of the present disclosure.

FIG. 5 is a flow diagram generally illustrating a brake pull mitigation method 500, according to the principles of the present disclosure. At 502, the method 500 detects road load due to brake pull.

At 504, the method 500 determines whether the vehicle is braking. If the method 500 determines the vehicle is braking, the method 500 continues at 506. Alternatively, the method continues at 518.

At 506, the method 500 determines whether the vehicle is experiencing brake pull. If the method 500 determines that the vehicle is experiencing brake pull, the method 500 continues at 508. Alternatively, the method 500 continues at 518.

At 508, the method 500 determines whether the vehicle is moving straight and whether the driver intended the vehicle to move straight. If the method 500 determines that the vehicle is moving straight and the driver intended for the vehicle to move straight, the method 500 continues at 510. Alternatively, if the method 500 determines that the vehicle is not moving straight or that the driver did not intend for the vehicle to move straight, the method 500 continues at 512.

At 510, the method 500 learns, using a stochastic gradient descent, the function coefficients for rack-force impact due to brake pull.

At 512, the method 500 determines whether learning is matured. If the method 500 determines that learning is matured, the method 500 continues at 514. Alternatively, the method 500 continues at 518.

At 514, the method 500 predicts rack load effects due to brake pull.

At 516, the method 500 generates command to handwheel actuator that opposes the effect of brake pull on the steering wheel (e.g., handwheel) torque.

At 518, the method 500 takes no action.

Figure 6:
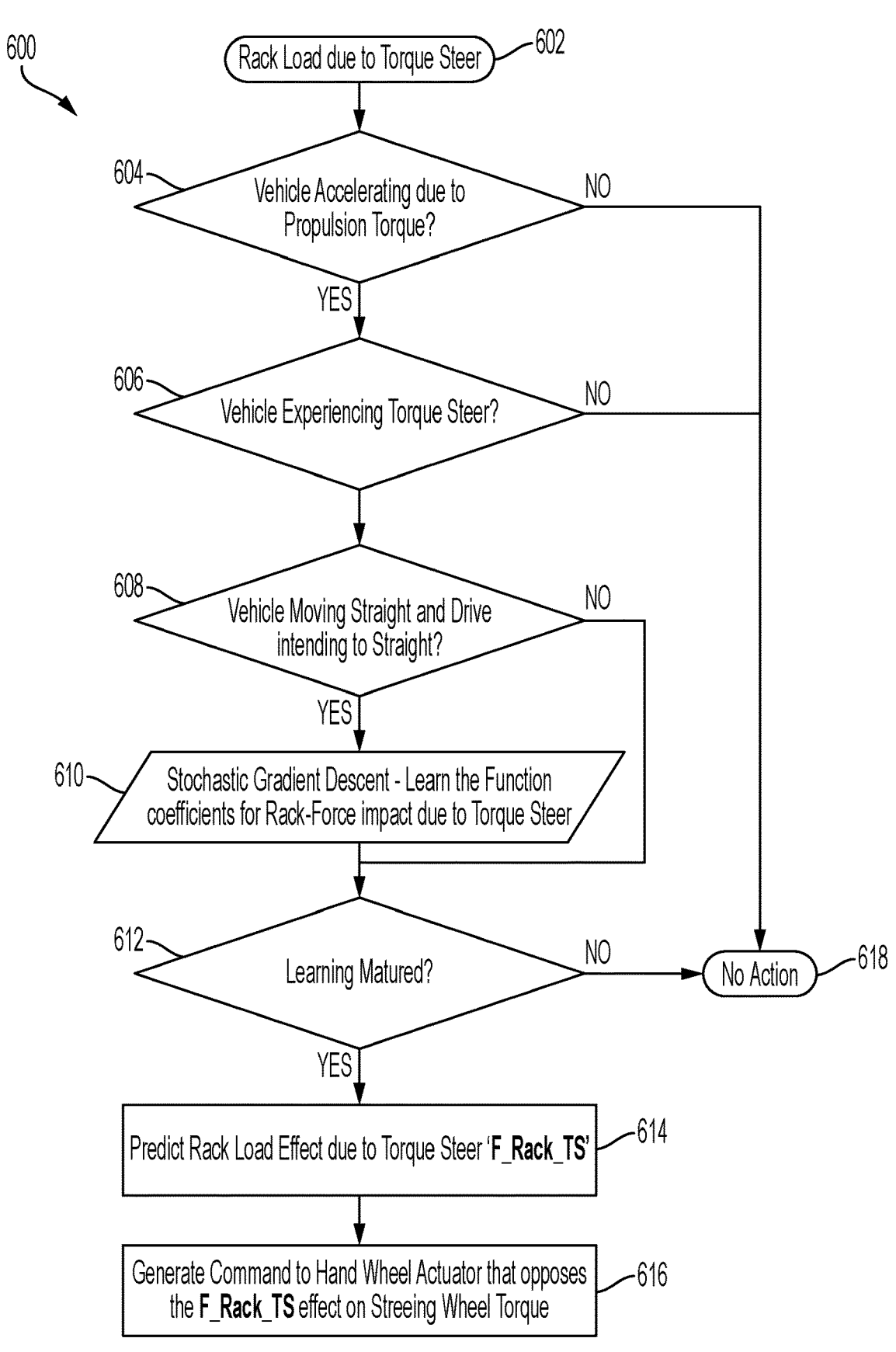
FIG. 6 is a flow diagram generally illustrating a torque steer mitigation method according to the principles of the present disclosure.

FIG. 6 is a flow diagram generally illustrating a torque steer mitigation method 600, according to the principles of the present disclosure. At 602, the method 600 detects road load due to torque steer.

At 604, the method 600 determines whether the vehicle is accelerating due to propulsion torque. If the method 600 determines that the vehicle is accelerating due to propulsion torque, the method 600 continues at 606. Alternatively, the method 600 continues at 618.

At 606, the method 600 determines whether the vehicle is experiencing torque steer. If the method 600 determines that the vehicle is experiencing torque steer, the method 600 continues at 608. Alternatively, the method 600 continues at 618.

At 608, the method 600 determines whether the vehicle is moving straight and whether the driver intended the vehicle to move straight. If the method 600 determines that the vehicle is moving straight and the driver intended for the vehicle to move straight, the method 600 continues at 610.

Alternatively, if the method 600 determines that the vehicle is not moving straight or that the driver did not intend for the vehicle to move straight, the method 600 continues at 612.

At 610, the method 600 learns, using a stochastic gradient descent, the function coefficients for rack-force impact due to torque steer.

At 612, the method 600 determines whether learning is matured. If the method 600 determines that learning is matured, the method 600 continues at 614. Alternatively, the method 600 continues at 618.

At 614, the method 600 predicts rack load effects due to torque steer.

At 616, the method 600 generates command to handwheel actuator that opposes the effect of torque steer on the steering wheel (e.g., handwheel) torque.

At 618, the method 600 takes no action.

FIG. 7 is a flow diagram generally illustrating method 700, according to the principles of the present disclosure. At 702, the method 700, in response to a determination that a vehicle is braking, determines whether the vehicle is experiencing brake pull.

At 704, the method 700, in response to a determination that the vehicle is experiencing brake pull, determines whether the vehicle is moving in according to a driver intention.

At 706, the method 700, in response to a determination that the vehicle is moving according to the driver intention, learns function coefficients for a rack-force impact due to the brake pull.

At 708, the method 700, in response to a determination that a learning is matured, predicts a rack load effect due to the brake pull.

At 710, the method 700 generates a handwheel actuator command configured to, when applied to the handwheel actuator, cause the handwheel actuator to oppose the rack load effect.

In some embodiments, a system for mitigating undesirable steering torque includes a processor, and a memory. The memory includes instructions that, when executed by the processor, cause the processor to: in response to a determination that a vehicle is braking, determine whether the vehicle is experiencing brake pull; in response to a determination that the vehicle is experiencing brake pull, determine whether the vehicle is moving in according to a driver intention; in response to a determination that the vehicle is moving according to the driver intention, learn function coefficients for a rack-force impact due to the brake pull; in response to a determination that a learning is matured, predict a rack load effect due to the brake pull; and generate a handwheel actuator command, the handwheel actuator command being configured to, when applied to the handwheel actuator, cause the handwheel actuator to oppose the rack load effect.

In some embodiments, the vehicle is moving substantially straight and the driver intention indications an intention for the vehicle to move substantially straight. In some embodiments, the handwheel actuator is associated with a steering system of the vehicle. In some embodiments, the steering system includes a steer-by-wire steering system.

In some embodiments, a method for mitigating undesirable steering torque includes: in response to a determination that a vehicle is braking, determining whether the vehicle is experiencing brake pull: in response to a determination that the vehicle is experiencing brake pull, determining whether the vehicle is moving in according to a driver intention; in response to a determination that the vehicle is moving according to the driver intention, learning function coefficients for a rack-force impact due to the brake pull; in response to a determination that a learning is matured, predicting a rack load effect due to the brake pull; and generating a handwheel actuator command, the handwheel actuator command being configured to, when applied to the handwheel actuator, cause the handwheel actuator to oppose the rack load effect.

In some embodiments, the vehicle is moving substantially straight and the driver intention indications an intention for the vehicle to move substantially straight. In some embodiments, the handwheel actuator is associated with a steering system of the vehicle. In some embodiments, the steering system includes a steer-by-wire steering system.

In some embodiments, a system for mitigating undesirable steering torque includes a processor; and a memory including instructions that, when executed by the processor, cause the processor to: in response to a determination that a vehicle is braking, determine whether the vehicle is experiencing brake pull; in response to a determination that the vehicle is experiencing brake pull, determine whether the vehicle is moving according to a driver intention; in response to a determination that the vehicle is moving according to the driver intention, learn function coefficients for a rack-force impact due to the brake pull; predict a rack load effect due to the brake pull; and generate a handwheel actuator command based on the predicted rack load effect.

In some embodiments, the instructions further cause the processor to determine whether a learning is matured. In some embodiments, the learning is matured after a predetermined number of learning cycles. In some embodiments, the predetermined number of cycles is 10. In some embodiments, the instructions further cause the processor to predict the rack load effect due to the brake pull, in response to a determination that the learning is matured. In some embodiments, the vehicle is moving substantially straight and the driver intention indications an intention for the vehicle to move substantially straight. In some embodiments, the handwheel actuator is associated with a steering system of the vehicle. In some embodiments, the steering system includes a steer-by-wire steering system. In some embodiments, the handwheel actuator command being configured to, when applied to a handwheel actuator, cause the handwheel actuator to oppose the rack load effect. In some embodiments, the instructions further cause the processor to apply the handwheel actuator command to a handwheel actuator to selectively control at least one aspect of vehicle steering.

In some embodiments, a method for mitigating undesirable steering torque includes: in response to a determination that a vehicle is braking, determining whether the vehicle is experiencing brake pull; in response to a determination that the vehicle is experiencing brake pull, determining whether the vehicle is moving according to a driver intention; in response to a determination that the vehicle is moving according to the driver intention, learning function coefficients for a rack-force impact due to the brake pull; predicting a rack load effect due to the brake pull; and generating a handwheel actuator command based on the predicted rack load effect.

In some embodiments, the method also includes determining whether a learning is matured. In some embodiments, the learning is matured after a predetermined number of learning cycles. In some embodiments, the predetermined number of cycles is 10. In some embodiments, the method also includes predicting the rack load effect due to the brake pull, in response to a determination that the learning is matured. In some embodiments, the vehicle is moving substantially straight and the driver intention indications an intention for the vehicle to move substantially straight. In some embodiments, the handwheel actuator is associated with a steering system of the vehicle. In some embodiments, the steering system includes a steer-by-wire steering system. In some embodiments, the handwheel actuator command being configured to, when applied to a handwheel actuator, cause the handwheel actuator to oppose the rack load effect.

In some embodiments, an apparatus for mitigating undesirable steering torque includes a controller configured to: in response to a determination that a vehicle is experiencing brake pull, determine whether the vehicle is moving according to a driver intention; in response to a determination that the vehicle is moving according to the driver intention, learn function coefficients for a rack-force impact due to the brake pull; predict a rack load effect due to the brake pull; and generate a handwheel actuator command based on the predicted rack load effect.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

Having thus described the disclosure, it is claimed:

1. A system for mitigating undesirable steering torque, the system comprising:

a processor; and a memory including instructions that, when executed by the processor, cause the processor to:

in response to a determination that a vehicle is braking, determine whether the vehicle is experiencing brake pull;

in response to a determination that the vehicle is experiencing brake pull, determine whether the vehicle is moving according to a driver intention;

in response to a determination that the vehicle is moving according to the driver intention, learn, using a stochastic linear regression model,-function coefficients for a rack-force impact due to the brake pull, wherein the stochastic linear regression model is based on, at least, a rack acceleration magnitude, a rack velocity magnitude, and a column velocity magnitude;

predict a rack load effect due to the brake pull; and generate a handwheel actuator command based on the predicted rack load effect.

2. The system of claim 1, wherein the instructions further cause the processor to determine whether a learning is matured.

3. The system of claim 2, wherein the learning is matured after a predetermined number of learning cycles.

4. The system of claim 3, wherein the predetermined number of cycles is 10.

5. The system of claim 2, wherein the instructions further cause the processor to predict the rack load effect due to the brake pull, in response to a determination that the learning is matured.

6. The system of claim 1, wherein the vehicle is moving substantially straight and the driver intention indications an intention for the vehicle to move substantially straight.

7. The system of claim 1, wherein the handwheel actuator is associated with a steering system of the vehicle.

8. The system of claim 7, wherein the steering system includes a steer-by-wire steering system.

9. The system of claim 1, wherein the handwheel actuator command being configured to, when applied to a handwheel actuator, cause the handwheel actuator to oppose the rack load effect.

10. The system of claim 1, wherein the instructions further cause the processor to apply the handwheel actuator command to a handwheel actuator to selectively control at least one aspect of vehicle steering.

11. A method for mitigating undesirable steering torque, the method comprising:

in response to a determination that a vehicle is braking, determining whether the vehicle is experiencing brake pull;

in response to a determination that the vehicle is experiencing brake pull, determining whether the vehicle is moving according to a driver intention;

in response to a determination that the vehicle is moving according to the driver intention, learning, using a stochastic linear regression model, function coefficients for a rack-force impact due to the brake pull, wherein the stochastic linear regression model is based on, at least, a rack acceleration magnitude, a rack velocity magnitude, and a column velocity magnitude;

predicting a rack load effect due to the brake pull; and generating a handwheel actuator command based on the predicted rack load effect.

12. The method of claim 11, further comprising determining whether a learning is matured.

13. The method of claim 12, wherein the learning is matured after a predetermined number of learning cycles.

14. The method of claim 13, wherein the predetermined number of cycles is 10.

15. The method of claim 12, further comprising predicting the rack load effect due to the brake pull, in response to a determination that the learning is matured.

16. The method of claim 11, wherein the vehicle is moving substantially straight and the driver intention indications an intention for the vehicle to move substantially straight.

17. The method of claim 11, wherein the handwheel actuator is associated with a steering system of the vehicle.

18. The method of claim 17, wherein the steering system includes a steer-by-wire steering system.

19. The method of claim 11, wherein the handwheel actuator command being configured to, when applied to a handwheel actuator, cause the handwheel actuator to oppose the rack load effect.

20. An apparatus for mitigating undesirable steering torque, the apparatus comprising:

a controller configured to:

in response to a determination that a vehicle is experiencing brake pull:

determine whether the vehicle is moving according to a driver intention;

in response to a determination that the vehicle is moving according to the driver intention, learn function coefficients for a rack-force impact due to the brake pull;

predict a rack load effect due to the brake pull; and generate a handwheel actuator command based on the predicted rack load effect; and in response to a determination that a vehicle is experiencing torque steer:

determine whether the vehicle is moving according to a driver intention;

in response to a determination that the vehicle is moving according to the driver intention, learn, using a stochastic linear regression model, function coefficients for a rack-force impact due to the torque steer, wherein the stochastic linear regression model is based on, at least, a rack acceleration magnitude, a rack velocity magnitude, and a column velocity magnitude;

predict a rack load effect due to the torque steer; and generate a handwheel actuator command based on the predicted rack load effect.

* * * * *